(12) United States Patent
Kim et al.

(10) Patent No.: US 12,480,219 B2
(45) Date of Patent: Nov. 25, 2025

(54) ELECTRODE FOR ELECTROLYSIS

(71) Applicant: LG Chem, Ltd., Seoul (KR)

(72) Inventors: Yeon Yi Kim, Daejeon (KR); Hee Jun Eom, Daejeon (KR); Myung Hun Kim, Daejeon (KR); Dong Chul Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 879 days.

(21) Appl. No.: 17/609,999

(22) PCT Filed: Sep. 23, 2020

(86) PCT No.: PCT/KR2020/012850
§ 371 (c)(1),
(2) Date: Nov. 9, 2021

(87) PCT Pub. No.: WO2021/060822
PCT Pub. Date: Apr. 1, 2021

(65) Prior Publication Data
US 2022/0205120 A1     Jun. 30, 2022

(30) Foreign Application Priority Data

Sep. 26, 2019 (KR) .................. 10-2019-0119113

(51) Int. Cl.
*C25B 11/093*  (2021.01)
*C25B 1/34*    (2006.01)

(52) U.S. Cl.
CPC .............. *C25B 11/093* (2021.01); *C25B 1/34* (2013.01)

(58) Field of Classification Search
CPC . B01J 23/42; B01J 23/46; B01J 23/462; B01J 21/10
See application file for complete search history.

(56) References Cited

U.S. PATENT DOCUMENTS

| | | | |
|---|---|---|---|
| 10,329,172 B2 | 6/2019 | Tan et al. | |
| 2007/0289865 A1 | 12/2007 | DiFranco et al. | |
| 2008/0099328 A1 | 5/2008 | Arimoto | |
| 2010/0155235 A1 | 6/2010 | Arimoto | |
| 2011/0158892 A1 | 6/2011 | Yamaki | |
| 2012/0199473 A1 | 8/2012 | Antozzi et al. | |
| 2013/0153411 A1 | 6/2013 | Ishimaru | |
| 2014/0224666 A1* | 8/2014 | Kintrup ................ | B01J 23/462 427/126.3 |
| 2017/0247269 A1 | 8/2017 | Tan et al. | |
| 2019/0177188 A1* | 6/2019 | Oakes ................ | C25B 11/091 |
| 2019/0211464 A1 | 7/2019 | Jung et al. | |
| 2020/0208281 A1 | 7/2020 | Park et al. | |
| 2021/0130966 A1 | 5/2021 | Griffis et al. | |
| 2021/0139351 A1 | 5/2021 | Gu et al. | |
| 2021/0371995 A1 | 12/2021 | Funakawa et al. | |
| 2021/0395911 A1 | 12/2021 | Dukes et al. | |

FOREIGN PATENT DOCUMENTS

| | | | |
|---|---|---|---|
| CN | 108404950 A | 8/2018 | |
| CN | 110055548 A | 7/2019 | |
| CN | 110114513 A | 8/2019 | |
| EP | 3854913 A1 | 7/2021 | |
| JP | 2003277967 A | 10/2003 | |
| JP | 2006193768 A | 7/2006 | |
| JP | 2006299395 A | 11/2006 | |
| JP | 2008133532 A | 6/2008 | |
| JP | 2010030887 A | 2/2010 | |
| JP | 5006456 B2 | 8/2012 | |
| JP | 2017535675 A | 11/2017 | |
| KR | 20110107600 A | 10/2011 | |
| KR | 20140007195 A | 1/2014 | |
| KR | 20140007197 A | 1/2014 | |
| KR | 20140013326 A | 2/2014 | |
| KR | 20140129639 A | 11/2014 | |
| KR | 101710346 B1 | 2/2017 | |
| KR | 20190022333 A | 3/2019 | |
| KR | 20190036711 A | 4/2019 | |
| KR | 101950465 B1 | 5/2019 | |
| WO | WO-2015092371 A1 * | 6/2015 | ........... C25B 11/091 |
| WO | 2018165127 A1 | 9/2018 | |

OTHER PUBLICATIONS

Kasian et al ("On the Origin of the Improved Ruthenium Stability in RuO2—IrO2 Mixed Oxides", Journal of the Electrochemical Society, 163 (11) F3099-F3104 (2016)) (Year: 2016).*
Browne et al ("Low-Overpotential High-Activity Mixed Manganese and Ruthenium Oxide Electrocatalysts for Oxygen Evolution Reaction in Alkaline Media", ACS Catal. 2016, 6, 2408-2415). (Year: 2016).*
Audichon et al ("Effect of Adding CeO2 to RuO2—IrO2 Mixed Nanocatalysts: Activity towards the Oxygen Evolution Reaction and Stability in Acidic Media", Chem ElectroChem, 2015, 2, 1128-1137) (Year: 2015).*
Search report from International Application No. PCT/KR2020/012850 mailed Jan. 8, 2021.
Extended European Search Report including Written Opinion for Application No. 20869131.1 dated Jan. 25, 2023, pp. 1-8.

* cited by examiner

*Primary Examiner* — Alexander W Keeling
(74) *Attorney, Agent, or Firm* — Lerner David LLP

(57) ABSTRACT

The present invention relates to an electrode for electrolysis having a coating layer containing a ruthenium oxide, a platinum group oxide, and a manganese oxide. The electrode for electrolysis of the present invention is characterized by exhibiting excellent durability and an improved overvoltage since a tin oxide contained in a coating layer interacts with a ruthenium oxide and a platinum group oxide which are contained together to improve electrical conductivity.

12 Claims, No Drawings

ELECTRODE FOR ELECTROLYSIS

CROSS-REFERENCE TO RELATED APPLICATIONS

The present application is a national phase entry under 35 U.S.C. § 371 of International Application No. PCT/KR2020/012850, filed on Sep. 23, 2020, which priority from Korean Patent Application No. 10-2019-0119113, filed on Sep. 26, 2019, the disclosures of which are incorporated herein in entirety by reference.

TECHNICAL FIELD

Technical Field

The present invention relates to an electrode for electrolysis capable of improving an overvoltage, and a method for manufacturing the same.

BACKGROUND ART

A technology for electrolyzing low-cost brine such as seawater to produce hydroxides, hydrogen, and chlorine is well known. Such an electrolysis process is also commonly referred to as a chlor-alkali process, and can be referred to as a process in which the performance and the reliability of technology have already been demonstrated with commercial operation for several decades.

For the electrolysis of brine, an ion exchange membrane method, in which an ion exchange membrane is installed inside an electrolytic cell so that the electrolytic cell is divided into a cation chamber and an anion chamber, and the brine is used as an electrolyte to obtain a chlorine gas from the anode and obtain hydrogen and caustic soda from the cathode, is most widely used in recent years.

Meanwhile, the electrolysis process of the brine is carried out by a reaction as described in an electrochemical reaction scheme below:

Anode reaction: 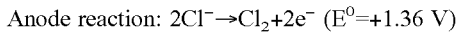 $2Cl^- \rightarrow Cl_2 + 2e^-$ ($E^0 = +1.36$ V)
Cathode reaction: 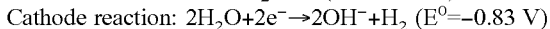 $2H_2O + 2e^- \rightarrow 2OH^- + H_2$ ($E^0 = -0.83$ V)
Overall reaction: 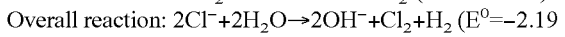 $2Cl^- + 2H_2O \rightarrow 2OH^- + Cl_2 + H_2$ ($E^0 = -2.19$ V)

In performing the electrolysis of the brine, with respect to the electrolysis voltage, a theoretical voltage that is needed for electrolysis of brine as well as an overvoltage of the anode, an overvoltage of the cathode, a voltage due to the resistance of the ion exchange membrane, and a voltage due to the distance between the anode and the cathode should all be considered, and the overvoltages due to the electrodes among these voltages have been acting as an important variable.

Thus, studies on a method, which can reduce the overvoltages of the electrodes, have been carried out, and for example, a precious metal-based electrode, called Dimensionally Stable Anode (DSA), has been developed and used as an anode, and for a cathode, development of an excellent material with durability and low overvoltage has been required.

Stainless steel or nickel has been primarily used as the cathode, and a method, in which the surface of the stainless steel or nickel is coated with a nickel oxide, an alloy of nickel and tin, a combination of activated carbon and oxide, a ruthenium oxide, platinum, etc. and used, has recently been studied in order to reduce the overvoltage.

In addition, in order to adjust a composition of active materials to improve the activity of the cathode, a method, in which platinum group elements such as ruthenium and lanthanides such as cerium are used to adjust the composition, has also been studied. However, there have been limitations in that the overvoltage phenomenon occurs and the deterioration due to reverse current occurs.

PRIOR ART DOCUMENTS (Patent Document 1) JP 2003-277967A

DISCLOSURE OF THE INVENTION

Technical Problem

An aspect of the present invention provides an electrode for electrolysis capable of reducing an overvoltage by improving electrical characteristics of an electrode surface coating layer.

Technical Solution

According to an aspect of the present invention, there is provided an electrode for electrolysis including a metal substrate layer, and a coating layer containing a ruthenium oxide, a platinum group oxide, and a manganese oxide, wherein the coating layer is formed on at least one surface of the substrate layer.

According to another aspect of the present invention, there is also provided a method for manufacturing an electrode for electrolysis, the method including applying a coating composition on at least one surface of a metal substrate, and drying and heat-treating the metal substrate applied with the coating composition to coat the metal substrate, wherein the coating composition contains a ruthenium precursor, a platinum group precursor, and a manganese precursor.

Advantageous Effects

The electrode for electrolysis of the present invention exhibits an excellent overvoltage and also has excellent durability since a tin oxide contained in a coating layer interacts with a ruthenium oxide and a platinum group oxide which are contained together to improve electrical conductivity.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Electrode for Electrolysis

The present invention provides an electrode for electrolysis including a metal substrate layer, and a coating layer containing a ruthenium oxide, a platinum group oxide, and a manganese oxide, in which the coating layer is formed on at least one surface of the substrate layer.

The metal substrate may be nickel, titanium, tantalum, aluminum, hafnium, zirconium, molybdenum, tungsten, stainless steel, or an alloy thereof, and among these, preferably, nickel. In the electrode for electrolysis of the present invention, when such kinds of metal substrates as these are used, excellent durability and mechanical strength may be provided to the electrode.

In the electrode for electrolysis of the present invention, the coating layer contains the ruthenium oxide. The ruthenium oxide serves to provide a ruthenium element as an active material to the coating layer, and when the ruthenium oxide is used in the coating layer of the electrode for electrolysis, the overvoltage phenomenon is improved as well as performance of the electrode changes less over time, and a separate subsequent activation process may be minimized. The ruthenium oxide includes all kinds of oxide forms in which a ruthenium element is bonded with an oxygen atom, and particularly, may be a dioxide or a tetroxide.

In the electrode for electrolysis of the present invention, the coating layer contains the platinum group oxide. The platinum group oxide refers to oxides of the other elements except for the above-described ruthenium among the platinum group elements, and particularly, may be a rhodium oxide, a palladium oxide, an osmium oxide, an iridium oxide, or a platinum oxide. The platinum group element provided by the platinum group oxide may act as an active material like the ruthenium element, and when the platinum group oxide and the ruthenium oxide are contained together in the coating layer, more excellent effect may be exhibited in terms of the durability of the electrode and the overvoltage. The platinum group oxide includes all the kinds of oxide forms in which a platinum group element is bonded with an oxygen atom, particularly, may be a dioxide or a tetroxide, and is preferably platinum oxide or iridium oxide.

In the electrode for electrolysis of the present invention, the coating layer contains the manganese oxide. The manganese oxide interacts with the ruthenium oxide and the platinum group oxide as described above to improve the electrical conductivity of the coating layer, thereby improving the final overvoltage of the electrode for electrolysis. The manganese oxide includes all the kinds of oxide forms in which a manganese element is bonded with an oxygen atom, and particularly, may be manganese(II, III) oxide ($Mn_3O_4$) or manganese(III) oxide ($Mn_2O_3$).

The weight ratio of the ruthenium element to the platinum group element contained in the coating layer may be 100:40 to 100:70, and preferably, 100:50 to 100:65. When the weight ratio of the ruthenium element to the platinum group element contained in the coating layer is within the above-described range, it is preferable in terms of the durability and overvoltage improvement, when the platinum group elements are contained less than the range, the durability and the overvoltage may be deteriorated, and when being contained greater than the range, it is unfavorable in view of the economic feasibility.

The weight ratio of the ruthenium element and the manganese element contained in the coating layer may be 100:5 to 100:30, and preferably, 100:10 to 100:25. When the weight ratio of the ruthenium element to the manganese element contained in the coating layer is within the above-described range, the effect of improving the electrical conductivity of the coating layer may be maximized.

In the electrode for electrolysis of the present invention, the coating layer may further include a cerium oxide, and the cerium oxide serves to provide lanthanides to a catalyst layer of the electrode for electrolysis. The cerium elements provided by the cerium oxide may improve the durability of the electrode for electrolysis, thereby minimizing the loss of the ruthenium elements as active materials in the catalyst layer of the electrode for electrolysis during activation or electrolysis.

In more detail, when activating the electrode for electrolysis or electrolyzing, particles containing the ruthenium elements in the catalyst layer become metal elements or are partially hydrated to be reduced to active species without changing the structure thereof. In addition, particles containing the lanthanides in the catalyst layer may change the structure into a needle-shape to serve as protective materials to prevent particles containing the ruthenium elements in the catalyst layer from being physically separated, resulting in the improvement of the durability of the electrode for electrolysis to thereby prevent the loss of the ruthenium elements in the catalyst layer. The cerium oxide includes all kinds of oxide forms in which a cerium element is bonded with an oxygen atom, and particularly, may be a cerium(II) oxide, a cerium(III) oxide, or a cerium(IV) oxide.

The weight ratio of the ruthenium element and the cerium element contained in the coating layer may be 100:40 to 100:90, and preferably, 100:45 to 100:85. When the weight ratio of the ruthenium element and the cerium element contained in the coating layer is within the above-described range, the balance between the durability and the electrical conductivity of the electrode for electrolysis may be excellent.

Method for Manufacturing Electrode for Electrolysis

The present invention provides a method for manufacturing an electrode for electrolysis, the method including: applying a coating composition on at least one surface of a metal substrate; and drying and heat-treating the metal substrate applied with the coating composition to coat the same, in which the coating composition contains a ruthenium precursor, a platinum group precursor, and a manganese precursor.

In the method for manufacturing an electrode for electrolysis of the present invention, the metal substrate may be the same as the metal substrate of the electrode for electrolysis as described above.

In the method for manufacturing an electrode for electrolysis of the present invention, the coating composition may contain the ruthenium precursor, the platinum group precursor, and the manganese precursor. The ruthenium precursor, the platinum group precursor, and the manganese precursor are oxidized in the heat-treating after the coating to be converted into oxides.

Any compounds can be used as the ruthenium precursor without particular limitation as long as they can form ruthenium oxides, and may be, for example, a hydrate, hydroxide, halide or oxide of ruthenium, and particularly, at least one selected from the group consisting of ruthenium hexafluoride ($RuF_6$), ruthenium(III) chloride ($RuCl_3$), ruthenium(III) chloride hydrate ($RuCl_3 \cdot xH_2O$), ruthenium(III) bromide ($RuBr_3$), ruthenium(III) bromide hydrate ($RuBr_3 \cdot xH_2O$), ruthenium iodide ($RuI_3$), and ruthenium acetate. When the above-listed ruthenium precursors are used, the ruthenium oxide may easily be formed.

Any compounds can be used as the platinum group precursor without particular limitation as long as they can form platinum group oxides, and may be, for example, a hydrate, hydroxide, halide or oxide of platinum group elements, and particularly, may be at least one platinum group precursor selected from the group consisting of chloroplatinic acid hexahydrate ($H_2PtCl_6 \cdot 6H_2O$), diamine dinitro platinum ($Pt(NH_3)_2(NO)_2$), platinum(IV) chloride ($PtCl_4$), platinum(II) chloride ($PtCl_2$), potassium tetrachloroplatinate ($K_2PtCl_4$), potassium hexachloroplatinate ($K_2PtCl_6$), or an iridium precursor such as iridium chloride or iridium chloride hydrate ($IrCl_3 \cdot xH_2O$). When the above-listed platinum group precursors are used, the platinum group oxide may easily be formed.

Any compounds can be used as the manganese precursor without particular limitation as long as they can form manganese oxides, and may be, for example, a hydrate, hydroxide, halide or oxide of manganese elements, and particularly, may be a manganese precursor such as manganese chloride, manganese chloride hydrate, manganese(II) nitrate hydrate, manganese(II) nitrate tetrahydrate, or manganese(II) nitrate. When the above-listed manganese precursors are used, the manganese oxide may easily be formed.

The coating composition may further include a cerium precursor for forming a cerium oxide in a coating layer. Any compounds can be used as the cerium precursor without particular limitation as long as they can form cerium oxides, and may be, for example, a hydrate, hydroxide, halide or oxide of cerium elements, and particularly, may be at least one cerium precursor selected from the group consisting of cerium(III) nitrate hexahydrate ($Ce(NO_3)_3 \cdot 6H_2O$), cerium (IV) sulfate tetrahydrate ($Ce(SO_4)_2 \cdot 4H_2O$), and cerium(III) chloride heptahydrate ($CeCl_3 \cdot 7H_2O$). When the above-listed cerium precursors are used, the cerium oxide may easily be formed.

In the method for manufacturing an electrode for electrolysis of the present invention, the coating composition may further include amine-based additives for imparting strong adhesion between the coating layer and the metal substrate. In particular, the amine-based additives may improve a binding force among the ruthenium element, the platinum group element, and the manganese element contained in the coating layer, and adjust an oxidation state of the particles including the ruthenium elements to manufacture the electrode in a form more appropriate to the reaction.

The amine-based additives used in the present invention have an amine group and a high solubility in water, and are particularly suitable to be used for forming the coating layer. The amine-based additives that may be used in the present invention include melamine, ammonia, urea, 1-propylamine, 1-butylamine, 1-pentylamine, 1-heptylamine, 1-octylamine, 1-nonylamine, 1-dodecylamine, etc., and at least one selected from the group consisting of the same may be used.

In the electrode for electrolysis of the present invention, the ruthenium elements and the amine-based additives of the coating layer may be contained in a molar ratio of 100:10 to 100:50, preferably 100:25 to 100:35. When the amine-based additives are contained less than the above range, the effect of improving the binding force by the additives is insignificant, and when the amine-based additives are contained greater than the above range, the precipitate is likely to occur in a coating solution, and thus the uniformity of the coating may be deteriorated as well as the function of the ruthenium oxide may be prevented.

In the method for manufacturing an electrode for electrolysis of the present invention, an alcohol-based solvent may be used as a solvent of the coating composition.

When the alcohol-based solvent is used, the above-described components are easily dissolved, and the bonding force of each component may be maintained even in the forming of the coating layer after applying the coating composition. Preferably, at least one among isopropyl alcohol and butoxyethanol may be used as the solvent, and more preferably, a mixture of isopropyl alcohol and butoxyethanol may be used. When the isopropyl alcohol and butoxyethanol are mixed and used, a uniform coating can be performed compared to used alone.

The manufacturing method of the present invention may include pre-treating the metal substrate before performing the coating.

In the pre-treating, the metal substrate may be subjected to chemical etching, blasting, or thermal spraying to form unevenness on the surface of the metal substrate.

The pre-treating may be performed by sandblasting the surface of the metal substrate to form fine unevenness thereon and treating base or acid. For example, the pre-treating may be performed so that the surface of the metal substrate may be sandblasted with alumina to form unevenness, immersed in a sulfuric acid aqueous solution, washed and dried to form fine unevenness on the surface of the metal substrate.

The applying is not particularly limited as long as the catalyst composition can be evenly applied onto the metal substrate, and the applying may be performed in a method known in the art.

The applying may be performed by any one method selected from the group consisting of doctor blade, die casting, comma coating, screen printing, spraying, electrospinning, roll coating, and brushing.

The drying may be performed at 50° C. to 300° C. for 5 minutes to 60 minutes, and is preferably performed at 50° C. to 200° C. for 5 minutes to 20 minutes.

If the aforementioned conditions are satisfied, the solvent may be sufficiently removed while energy consumption may be minimized.

The heat-treating may be performed at 400° C. to 600° C. for 1 hour or less, and is preferably performed at 450° C. to 550° C. for 5 minutes to 30 minutes.

If the aforementioned conditions are satisfied, impurities in the catalyst layer may easily be removed without affecting the strength of the metal substrate.

Meanwhile, the coating may be performed by sequentially repeating the coating, drying, and heat-treating such that the coating is at least 10 g based on the ruthenium oxide per unit area ($m^2$) of the metal substrate. That is, the manufacturing method according to another embodiment of the present invention can be performed by repeating the coating in which the catalyst composition is applied, dried, and heat-treated onto at least one surface of the metal substrate, and then a catalyst composition is applied, dried, and heat-treated again onto one surface of the metal substrate applied with the first catalyst composition.

Hereinafter, examples and experimental examples will be explained in more detail in order to particularly explain the present invention, but the present invention is not limited to the examples and experimental examples. The examples according to the present invention may be modified in various other types, and the scope of the present invention should not be interpreted to be limited to the examples explained below. Rather, the examples of the present invention are provided so that this description will be thorough and complete, and will fully convey the scope of the present invention to those skilled in the art.

Materials

In the present examples, a nickel-mesh substrate (Ni purity of 99% or greater, 200 μm) manufactured by Il-dong Wire Cloth Co. was used as a metal substrate, ruthenium(III) chloride hydrate ($RuCl_3 \cdot nH_2O$) was used as a ruthenium precursor, platinum(IV) chloride was used as a platinum group precursor, a cerium(III) nitrate hexahydrate ($Ce(NO_3)_3 \cdot 6H_2O$) was used as a cerium precursor, and manganese(II) chloride tetrahydrate ($MnCl_2 \cdot 4H_2O$) was used as a manganese precursor. Urea was used as an amine-based additive.

In addition, a mixture of 2.375 mL of isopropyl alcohol and 2.375 mL of 2-butoxyethanol was used as a solvent for the coating composition.

Pre-Treating of Metal Substrate

Before forming the coating layer on the metal substrate, the surface of the substrate was sandblasted with aluminum oxide (White alumina, F120) under the condition of 0.4 MPa, and then was added to 5M $H_2SO_4$ aqueous solution, which had been heated to 80° C., and treated for 3 minutes, followed by washing the substrate with distilled water to complete the pre-treating.

EXAMPLE 1

In the mixed solvent of the above materials, 2.41 mmol of ruthenium(III) chloride hydrate, 0.1928 mmol of platinum (IV) chloride, and 0.482 mmol of manganese(II) chloride tetrahydrate were fully dissolved for 1 hour, and 0.045 g of urea was added thereto and mixed to prepare a coating composition. The coating composition was coated onto the above-pre-treated metal substrate by using brush, and the coated metal substrate was put in a convection drying oven and dried at 180° C. for 10 minutes. Then, the metal substrate was put in a 500° C. electric heating furnace and further heat-treated for 10 minutes, this process of coating, drying, and heat-treating was repeated another nine times, and then, the metal substrate was finally heat-treated at 500° C. for 1 hour to manufacture an electrode for electrolysis.

EXAMPLE 2

The electrode for electrolysis was manufactured by the same method as in Example 1 above except that 0.241 mmol of cerium(III) nitrate hexahydrate was further added to the coating composition and 0.241 mmol of manganese(II) chloride tetrahydrate was added.

COMPARATIVE EXAMPLE 1

The electrode for electrolysis was manufactured by the same method as in Example 1 above except that platinum (IV) chloride was not added to the coating composition.

COMPARATIVE EXAMPLE 2

The electrode for electrolysis was manufactured by the same method as in Example 2 above except that platinum (IV) chloride was not added to the coating composition.

COMPARATIVE EXAMPLE 3

The electrode for electrolysis was manufactured by the same method as in Example 2 above except that manganese (II) chloride tetrahydrate was not added, and 0.482 mmol of cerium(III) nitrate hexahydrate was added.

COMPARATIVE EXAMPLE 4

The electrode for electrolysis was manufactured by the same method as in Comparative Example 1 above except that platinum(IV) chloride was not added to the coating composition.

The molar ratio between each precursor in the coating composition used in Examples 1 and 2, and Comparative Examples 1 to 4 above are shown in Table 1 below.

TABLE 1

|  | Example 1 | Example 2 | Comparative Example 1 | Comparative Example 2 | Comparative Example 3 | Comparative Example 4 |
|---|---|---|---|---|---|---|
| Ruthenium | 2.41 | 2.41 | 2.41 | 2.41 | 2.41 | 2.41 |
| Manganese | 0.482 | 0.241 | 0.482 | 0.241 | — | — |
| Platinum | 0.1928 | 0.1928 | — | — | 0.1928 | — |
| Cerium | — | 0.241 | — | 0.241 | 0.482 | 0.482 |

EXPERIMENTAL EXAMPLE 1

Confirmation of Performance of Manufactured Electrode for Electrolysis

In order to confirm the performance of the electrode manufactured in Examples 1 and 2 and Comparison Examples 1 to 4 above, a cathode voltage measurement test was carried out by using a half-cell in the chlor-alkali electrolysis. As an electrolyte solution, 32% NaOH aqueous solution was used, a Pt wire as a counter electrode, and Hg/HgO electrode as a reference electrode. The manufactured electrodes were immersed in the electrolyte solution, and then were activated for 1 hour under the condition of the constant current density of $-0.62$ $A/cm^2$, followed by the comparison of the performance of each electrode using a potential value at 1 hour. The results are shown in Table 2 below.

TABLE 2

| Division | Example 1 | Example 2 | Comparative Example 1 | Comparative Example 2 | Comparative Example 3 | Comparative Example 4 |
|---|---|---|---|---|---|---|
| Cathode potential (Unit: V) | −1.072 | −1.077 | −1.079 | −1.088 | −1.092 | −1.104 |

From the above results, it was confirmed that when the manganese oxide was further added to the coating layer, the effect of improving the overvoltage was exhibited.

EXPERIMENTAL EXAMPLE 2

Mass Spectrometric Analysis of Coating Layer of Electrode

The weight ratio (%) for each metal component of the surface coating layer of the electrode manufactured in Examples and Comparative Examples above was analyzed through X-ray Fluorescence Spectrometer (XRF). The results are shown in Table 3 below.

TABLE 3

| Division | Example 1 | Example 2 | Comparative Example 1 | Comparative Example 2 | Comparative Example 3 | Comparative Example 4 |
|---|---|---|---|---|---|---|
| Ru | 5.76 | 5.49 | 5.65 | 5.78 | 5.49 | 5.63 |
| Mn | 1.29 | 0.72 | 1.32 | 1.64 | — | — |
| Pt | 3.22 | 3.26 | — | — | 3.17 | — |
| Ce | — | 2.35 | — | 2.67 | 4.44 | 4.36 |

From the results of Table 3 above, it was confirmed that even though the manganese oxide was contained in the coating layer, the composition of the other metal components was not affected and oxides can be formed.

The invention claimed is:

1. An electrode for electrolysis comprising:
a metal substrate layer; and
a coating layer containing of a ruthenium oxide, a platinum oxide, and a manganese oxide,
wherein the coating layer is formed on at least one surface of the substrate layer,
wherein a weight ratio of ruthenium element and platinum element contained in the coating layer is 100:40 to 100:70; and
wherein a weight percent ratio for each element in the coating layer is 5.49 to 5.76 for the ruthenium element, 3.22 to 3.26 for the platinum element, and 0.72 to 1.29 for the manganese element.

2. The electrode of claim 1, wherein a weight ratio of ruthenium elements and manganese elements contained in the coating layer is 100:5 to 100:30.

3. The electrode of claim 1, wherein the coating layer further contains a cerium oxide.

4. The electrode of claim 3, wherein a weight ratio of ruthenium elements and cerium elements contained in the coating layer is 100:40 to 100:90.

5. A method for manufacturing an electrode for electrolysis, the method comprising:
applying a coating composition on at least one surface of a metal substrate; and
drying and heat-treating the metal substrate applied with the coating composition to coat the metal substrate,
wherein the coating composition contains a ruthenium oxide, a platinum oxide, and a manganese oxide; and
wherein a weight ratio of ruthenium element and platinum element contained in the coating layer is 100:40 to 100:70; and wherein a weight percent ratio for each element in the coating layer is 5.49 to 5.76 for the ruthenium element, 3.22 to 3.26 for the platinum element, and 0.72 to 1.29 for the manganese element.

6. The method of claim 5, wherein the coating composition further contains a cerium precursor.

7. The method of claim 5, wherein the ruthenium element is selected from the group consisting of ruthenium hexafluoride (RuF6), ruthenium (III) chloride (RuCl3), ruthenium (III) chloride hydrate (RuCl3 xH2O), ruthenium(III) bromide (RuBr3), ruthenium(III) bromide hydrate (RuBr3-xH2O), ruthenium iodide (RuI3), and ruthenium acetate.

8. The method of claim 5, wherein the manganese element is selected from the group consisting of manganese chloride, manganese chloride hydrate, manganese(II) nitrate hydrate, manganese(II) nitrate tetrahydrate, and manganese(II) nitrate.

9. The method of claim 5, wherein the platinum element is selected from the group consisting of chloroplatinic acid hexahydrate ($H_2PtCl6\cdot6H_2O$), diamine dinitro platinum (Pt($NH_3)_2(NO)_2$), platinum(IV) chloride ($PtCl_4$), platinum(II) chloride ($PtCl_2$), potassium tetrachloroplatinate ($K_2PtCl_4$), and potassium hexachloroplatinate ($K_2PtCl_6$).

10. The method of claim 6, wherein the cerium element is selected from the group consisting of cerium(III) nitrate hexahydrate (Ce(NO$_3$)$_3$ 6H$_2$O), cerium(IV) sulfate tetrahydrate (Ce(SO$_4$)$_2$ 4H$_2$O), and cerium(III) chloride heptahydrate (CeCl$_3$ 7H$_2$O).

11. The method of claim 5, wherein the coating composition further contains an amine-based additive selected from the group consisting of melamine, ammonia, urea, 1-propylamine, 1-butylamine, 1-pentylamine, 1-heptylamine, 1-octylamine, 1-nonylamine, and 1-dodecylamine.

12. The method of claim 11, wherein a molar ratio of the ruthenium element and the amine-based additive contained in the coating composition is 100:10 to 100:50.

* * * * *